Patented Aug. 13, 1935

2,011,096

UNITED STATES PATENT OFFICE 2,011,096

FERMENTED BEVERAGE

Leo Wallerstein, New York, N. Y.

No Drawing. Application May 20, 1933, Serial No. 672,039

10 Claims. (Cl. 195—20)

The present invention relates to the maturing and ripening of fermented malt beverages and it particularly relates to the utilization of preparations of bio-catalyzers for the purpose of shortening the period required in the maturing and ripening of fermented malt beverages, such as beer and ale.

In my prior applications, Serial No. 668,986 filed May 2, 1933, and Serial No. 668,987 filed May 2, 1933, I have disclosed respectively the utilization, in ripening malt beverages, of bio-catalyzer mixtures or bio-catalyzer preparations derived from the cultivation of Bacillus subtilis and mesentericus and an activated enzyme preparation of plant origin which is active in slightly alkaline, neutral or slightly acid environment. These bio-catalyzer and/or activated plant enzyme preparations may be utilized singly or combined to facilitate the ripening and maturing of beer, ale, and other fermented malt beverages.

The present invention particularly relates to the discovery that similar acting bio-catalyzer preparations may be prepared by the cultivation of fungi and molds under certain specific conditions and may be similarly used in accelerating the ripening and maturing of malt beverages.

Beer is produced from malt, usually barley malt, hops, water and yeast with or without the addition of other cereals. In the brewing process the malt is cleaned and crushed and then mashed with or without other cereals. The resultant solution containing the extractives is strained or filtered from the grains or insoluble portions of the mash.

This solution, termed the wort, is boiled with the addition of hops. Then the hopped wort is strained or filtered from the spent hops, the wort is cooled, and yeast is added to incite fermentation. The malt beverage after fermentation is drawn off and is stored for a considerable length of time in order that it may ripen and mature.

Such ripening and maturing is usually brought about by storing the beverages in vats, known as storage vats, at low temperatures around 32 to 40° F. This time of aging varies, but for well-matured beverages, such as lager beers, it frequently requires from one to three months.

During the storing and aging a number of changes take place. For instance, the clarification, which results, may be readily followed by visual observation. Other changes cause improvement in the flavor, taste and general qualities. These changes are much more subtle and take place very slowly and gradually.

Up to the present time the mechanism of these changes has not been fully explained. The first mentioned changes, that is, the clarification of the beverages, may be assisted by the addition of finings, such as gelatin, to the beverage or by filtration. The ripening and maturing, however, resulting in general improvement in flavor and taste, is not readily subject to acceleration.

This long continued ripening and maturing of malt beverages, requires the utilization of a large amount of storage facilities, and considerably ties up the capital of the brewing establishment.

Moreover, when the beer is to be pasteurized and, for example, afterwards bottled, it has been found that the maturing and ripening must be accomplished before the pasteurization operation. The pasteurization operation apparently has the effect of stopping or preventing continuation of the normal maturing and ripening of beer, so that even though the beer be stored or kept in bottles for considerable periods of time after it has been pasteurized, no substantial maturing or ripening takes place.

An object of the present invention is to provide a product and process by which it will be possible to accelerate the maturing and ripening of a fermented beverage, with resultant economy in the cost of manufacture and with improvement in the quality of the malt beverage produced.

It has been found that by the use of a preparation containing metabolic products produced by the cultivation of certain specific fungi and molds, it is possible to accelerate and hasten the maturing and ripening of the beverage and to effect such maturing and ripening even after pasteurization.

Among the molds or fungi which have been found particularly suitable for the production of these bio-catalyzer preparations are those belonging to the group of the Aspergillus, Penicillium, Mucor and Amylomyces. For example, *Aspergillus orizae*, *Mucor delemar* and *Amylomyces rouxii* may be employed if desired, as may also be other members of the groups mentioned.

The bio-catalyzer preparations may be prepared from these fungi and molds in various ways, and by way of illustration one satisfactory method will be disclosed.

A culture medium, preferably consisting of comminuted or broken grains of cereals, such as wheat, corn, oats and barley, from which a greater part of the starchy material has been removed, is suitably moistened with water and thoroughly sterilized. The cultured medium may consist of bran shorts or middlings. Other media may be utilized, such as residues from beer brewing, alcohol fermentation processes, and so forth.

After the sterilization of the cultured media, as for example with steam, the spores of the desired fungus or mold are sown therein. The moisture of the media may vary, but preferably ranges between 30 to 60 degrees by weight.

After sowing the fungus seed spores upon the culture media, the entire mass is preferably formed into a bed, although this is not essential. This bed is maintained in a moist atmosphere at a uniform temperature varying from 35 to 45 degrees and preferably not exceeding the latter limit.

The growth may be continued while agitating the mass by stirring or the mass may be permitted to lie in quiescent condition. In the former case the thickness of the mass preferably is increased to 2 to 3 feet, while in the latter case the bed of material is kept fairly thin, as for example, from 1 to 2 inches in thickness.

The fungus or mold growth is permitted to continue from 30 to 90 hours and then the bio-catalyzer preparation is extracted by lixiviating the mass with water.

After this separation, the liquor is separated from the fungi or mold growth and the culture material. For example the growths and culture material may be removed by high speed centrifuges or by filtration. It must be done, however, under conditions to prevent infection. This is best accomplished either by operating at very low temperatures or preferably by the addition of suitable antiseptics, such as sulfites or alcohol, to the metabolic liquor.

The resulting liquor can be used as such for the purpose of accelerating the ripening and maturing of the beer. For this purpose, the addition of from 25 to 100 cubic centimeters of the metabolic liquor for each 31 gallon barrel of beer or ale, will be sufficient to accelerate substantially the ripening and maturing of same.

A better method, however, is to concentrate the active principles contained in the metabolic liquor and to use for commercial purposes the concentrated preparation which will be found to be more stable and can readily be transported. In order to prepare such a concentrated product, the bio-catalyzers contained in the liquor are precipitated from this liquor by the addition of sufficient amount of alcohol or acetone. As a general rule from one to two volumes of these precipitating agents are sufficient for every volume of the liquor to be precipitated.

A further method of concentrating consists in salting out the active principles by the addition to the metabolic liquor of about an equal volume of a saturated ammonium sulfate solution. In either case the precipitated material is separated by centrifuging or filtration and dried at a lower temperature, preferably of about less than 40 degrees C.

Only comparatively small amounts of these concentrated materials are necessary to accomplish the desired acceleration of the ripening and maturing of the beverage. For example, the addition of from 1 to 5 grams per 31 gallon barrel or per 117 liters of beverage has been found to give excellent results and greatly to hasten the maturing and ripening of the beverage. The addition of the bio-catalyzer either in the liquid form or in the active dry form may be made shortly prior to, during fermentation or shortly after the main fermentation has been finished.

It has also been found that the addition of these bio-products as described also brings about quicker clarification and according to tests, beers, ales, or other malt beverages so treated will mature in a shorter time than similar beers or ales to which these bio-catalyzers have not been added.

For example, as compared to the period of one to three months previously required for the ripening and maturing of malt beverages by the utilization of the bio-catalyzers of the present invention, it is possible to shorten the period of storage to as short a time as a week or ten days with the production of a beverage, beer or ale of the same or superior quality.

It has been found that the best results are obtained when the above described bio-catalyzers are added to the beer shortly before the fermentation is completed and when the beer still contains considerable amount of yeast.

It has been observed that upon the addition to beer when it still contains this yeast, the described action of the ripening and maturing of the beer is considerably accelerated.

While the mechanism of the action of these bio-catalyzers, as stated before, has not been established, it is probable that they have the power to act on the yeast cells and due to this action certain constituents contained in the yeast cells will diffuse from the yeast cells into the beer and thereby speed up the aging and maturing of the beer.

The addition of the bio-catalyzers, as described above, to the beer, ale, or other fermented beverage, has been found to cause continued ripening and maturing even though the beer be pasteurized and thereafter stored, as for example in bottles. By adding bio-catalyzers to beer which is to be pasteurized, it is not necessary to store the beer or other malt beverage for long periods of time before pasteurization to achieve the desired maturity and ripening. Moreover, although beer, ale, and other malt beverages frequently decrease in quality upon pasteurization, with the addition of bio-catalyzers according to the present invention, such disadvantageous effect of pasteurization appears to be altogether avoided.

The bio-catalyzer preparations of the present invention may be conveniently compounded with plant enzymes activated with sodium sulfite or sodium bisulfite, which are active in slightly acid, neutral and slightly alkaline media and/or with bio-catalyzer preparations produced by the cultivation of *Bacillus subtilis* and *mesentericus*.

The preparation derived from molds specifically above set forth seems to act in part in improving the malt beverage and in accelerating the maturing and ripening of it by changing the pectinous substances so that they will not impede the filtration and clarification of the beverage.

I claim:

1. The process of improving alcoholic fermented malt beverages which comprises adding to the beverage after the fermentation and before it has matured and ripened a metabolic material produced by the cultivation of a mold selected from the group consisting of the genera Aspergillus, Penicillium, Mucor, and Amylomyces, said metabolic material containing that portion thereof which is precipitable by salting out and by alcohol and then causing the beverage to mature and ripen.

2. The process of improving alcoholic fermented malt beverages which comprises adding to the beverage after the fermentation and before it has matured and ripened a metabolic material produced by the cultivation of *Aspergillus oryzae*, said metabolic material containing that portion thereof which is precipitable by salting out and by alcohol and then causing the beverage to mature and ripen.

3. The process of improving alcoholic fermented malt beverages which comprises adding to the beverage after the fermentation and before it has matured and ripened a metabolic material produced by the cultivation of *Amylomyces rouxii*, said metabolic material containing that portion thereof which is precipitable by salting out and by alcohol and then causing the beverage to mature and ripen.

4. The process of improving alcoholic fermented malt beverages which comprises adding to the beverage after the fermentation and before it has matured and ripened a metabolic material produced by the cultivation of *Penicillium glaucum*, said metabolic material containing that portion thereof which is precipitable by salting out and by alcohol and then causing the beverage to mature and ripen.

5. The process of improving alcoholic fermented malt beverages which comprises adding to the beverage after the fermentation and before it has matured and ripened twenty to one hundred cubic centimeters per 31 gallon barrel, of a metabolic liquor produced by the cultivation of a mold selected from the group consisting of the genera Aspergillus, Penicillium, Mucor, and Amylomyces, said metabolic material containing that portion thereof which is precipitable by salting out and by alcohol and then causing the beverage to mature and ripen.

6. The process of improving alcoholic fermented malt beverages which comprises adding to the beverage after the fermentation and before it has matured and ripened the precipitate produced by salting out a metabolic material produced by the cultivation of a mold selected from the group consisting of the genera Aspergillus, Penicillium, Mucor, and Amylomyces, said metabolic material containing that portion thereof which is precipitable by salting out and by alcohol and then causing the beverage to mature and ripen.

7. The process of improving alcoholic fermented malt beverages which comprises adding to the beverage after the fermentation and before it has matured and ripened a precipitate produced by adding an organic solvent to a metabolic material produced by the cultivation of a mold selected from the group consisting of the genera Aspergillus, Penicillium, Mucor, and Amylomyces, said metabolic material containing that portion thereof which is precipitable by salting out and by alcohol and then causing the beverage to mature and ripen.

8. The process of improving alcoholic fermented malt beverages which comprises adding to the beverage after the fermentation and before it has matured and ripened ½ to 10 grams per 31 gallon barrel, of a precipitate produced by salting out a metabolic material produced by the cultivation of a mold selected from the group consisting of the genera Aspergillus, Penicillium, Mucor, and Amylomyces, said metabolic material containing that portion thereof which is precipitable by salting out and by alcohol and then causing the beverage to mature and ripen.

9. The process of improving alcoholic fermented malt beverages which comprises adding to the beverage after the fermentation and before it has matured and ripened ½ to 10 grams per 31 gallon barrel, of a precipitate produced by adding an organic solvent to a metabolic material produced by the cultivation of a mold selected from the group consisting of the genera Aspergillus, Penicillium, Mucor, and Amylomyces, said metabolic material containing that portion thereof which is precipitable by salting out and by alcohol and then causing the beverage to mature and ripen.

10. In the process of making a beverage, which includes alcoholic fermentation of a boiled and cooled malt wort, adding to the beverage before it has matured and ripened the metabolic material produced by the cultivation of a mold selected from the group consisting of the genera Aspergillus, Penicillium, Mucor, and Amylomyces, the addition being before the material has matured and ripened, and then causing ripening and maturing of the material after the alcoholic fermentation.

LEO WALLERSTEIN.